(12) United States Patent
Lau et al.

(10) Patent No.: US 6,225,242 B1
(45) Date of Patent: May 1, 2001

(54) POLYMER COMPOSITIONS

(75) Inventors: Willie Lau, Ambler; Maureen Joanne Finley, Churchville, both of PA (US); Martin Marion Williams, Harrisburg, NC (US); Hal Conley Morris, Abington, PA (US)

(73) Assignee: Rohm and Haas Company, Phila., PA (US)

( * ) Notice: Subject to any disclaimer, the term of this patent is extended or adjusted under 35 U.S.C. 154(b) by 0 days.

(21) Appl. No.: 09/562,342

(22) Filed: May 1, 2000

Related U.S. Application Data

(62) Division of application No. 09/099,312, filed on Jun. 18, 1998.
(60) Provisional application No. 60/050,390, filed on Jun. 20, 1997.

(51) Int. Cl.$^7$ ....................................................... B32B 27/04
(52) U.S. Cl. .............................. 442/83; 428/375; 428/378; 428/511; 442/152; 442/164; 526/303.1; 526/304; 526/318.4; 526/328.5
(58) Field of Search ..................................... 428/375, 378, 428/511; 442/79, 83, 152, 164; 526/303.1, 304, 318.4, 328.5

(56) References Cited

U.S. PATENT DOCUMENTS 3,919,451 * 11/1975 Levy et al. ............................ 428/310

* cited by examiner

Primary Examiner—Helen L. Pezzuto

(57) ABSTRACT

Polymer compositions which are useful to improve water repellency and durability in fiber, nonwoven, textile, and paper compositions are disclosed. A method of improving water repellency and durability in fiber, nonwoven, textile, and paper compositions is also disclosed.

4 Claims, No Drawings

POLYMER COMPOSITIONS

This is a divisional of application Ser. No. 09/099,312 filed Jun. 18, 1998, allowed, which claims benefit of provisional application 60/050,390 filed Jun. 20, 1997.

This invention relates to polymer compositions, more specifically this invention relates to polymer compositions which are useful as binders in fiber, nonwoven, textile, and paper compositions.

Fiber, nonwoven, textile, and paper compositions typically are coated with polymeric binders to provide water repellency and durability. Self cross-linking acrylic polymers and styrene/acrylic polymers are typically used in these applications. There is a need for polymeric binders which provide improved water repellency and durability in fiber, nonwoven, textile, and paper compositions.

U.S. Pat. No. 5,521,266 discloses a method for forming polymers from hydrophobic monomers. The disclosed method utilizes macromolecular organic compounds which have a hydrophobic cavity to complex monomers which have low water solubility. This enables the formation of polymers from low water solubility monomers by emulsion polymerization. Suitable monomers for use in the method for forming polymers include lauryl methacrylate.

U.S. Pat. No. 3,915,921 discloses interpolymers made by solution polymerization. The interpolymers contain hydrophobic monomers including stearyl methacrylate, and certain carboxylic monomers including acrylic acid. The interpolymers are taught to be effective thickeners.

Despite the disclosure of the prior art, there is a continuing need for polymeric binders which provide improved water repellency and durability in fiber, nonwoven, textile, and paper compositions.

We have surprisingly found that the use of the polymer compositions of this invention provide improved water repellency and durability in fiber, nonwoven, textile, and paper compositions.

The present invention provides a composition comprising an emulsion polymer comprising as polymerized units:
i) a) from 9.5 to 99.9 parts by weight of at least one $C_{12}$ to $C_{40}$ alkyl ester of (meth)acrylic acid;
b) from 0 to 90 parts by weight of at least one less than $C_{15}$ ethylenically unsaturated nonionic monomer;
c) from 0 to 90 parts by weight of at least one ethylenically unsaturated acid containing monomer or salts thereof; and
d) from 0.1 to 10 parts by weight of at least one cross-linking monomer; and
ii) from 0 to 10 parts by weight, based on the polymer weight of at least one cross-linking agent,
provided that the composition contains 0.1 to 10 parts by weight, based on the polymer weight cross-linking monomer and cross linking agent.

In another embodiment, the present invention provides a method of improving water repellency and durability in fiber, nonwoven, textile, and paper compositions comprising:
a) providing a composition comprising an emulsion polymer comprising as polymerized units:
i) from 9.5 to 100 parts by weight of at least one $C_{12}$ to $C_{40}$ alkyl ester of (meth)acrylic acid;
from 0 to 90 parts by weight of at least one less than $C_{15}$ ethylenically unsaturated nonionic monomer;
from 0 to 90 parts by weight of at least one ethylenically unsaturated acid containing monomer or salts thereof; and
from 0 to 10 parts by weight of at least one cross-linking monomer; and
ii) from 0 to 10 parts by weight, based on the polymer weight of at least one cross-linking agent;
b) providing a substrate selected from the group consisting of fiber, nonwoven, textile, and paper;
c) coating the substrate with the polymer composition; and
d) drying the coated substrate.

The present invention also provides an article comprising:
a substrate selected from the group consisting of fiber, nonwoven, textile, and paper coated with an emulsion polymer composition comprising as polymerized units:
i) from 9.5 to 100 parts by weight of at least one $C_{12}$ to $C_{40}$ alkyl ester of (meth)acrylic acid;
from 0 to 90 parts by weight of at least one less than $C_{15}$ ethylenically unsaturated nonionic monomer;
from 0 to 90 parts by weight of at least one ethylenically unsaturated acid containing monomer or salts thereof; and
from 0 to 10 parts by weight of at least one cross-linking monomer; and
ii) from 0 to 10 parts by weight, based on the polymer weight of at least one cross-linking agent.

The compositions of this invention may be prepared by a single stage or multi-stage process. The process may be an emulsion polymerization such as the process described in U.S. Pat. No. 5,521,266. The process may also be solution polymerization followed by emulsification as described in U.S. Pat. No. 5,539,021, mini-emulsion polymerization, or micro-emulsion polymerization. Emulsion polymerization is preferred. In the process utilized for preparing the samples within this application, a first stage was prepared by adding a monomer emulsion and sodium persulfate to a solution containing methyl-β-cyclodextrin ("CD"), deionized water, and surfactant. The first stage was reacted at 85° C. A second stage was prepared by making a second monomer emulsion and feeding the second monomer emulsion and a sodium persulfate solution to the reacted first stage. The second stage was reacted at 85° C.

The compositions of this invention contain as polymerized units from 9.5 to 100 parts by weight, preferably from 15 to 80 parts by weight, more preferably 20 to 70 parts by weight of at least one $C_{12}$ to $C_{40}$ alkyl ester of (meth)acrylic acid. It is preferred that the alkyl ester of (meth)acrylic acid be a $C_{12}$ to $C_{30}$ alkyl ester of (meth)acrylic acid. It is more preferred that the alkyl ester of (meth)acrylic acid be a $C_{12}$ to $C_{18}$ alkyl ester of (meth)acrylic acid. Suitable alkyl esters of (meth)acrylic acid include cetyl (meth)acrylate, stearyl (meth)acrylate, behenyl (meth)acrylate, and eicosyl (meth) acrylate. Beneficial properties may be obtained by utilizing more than one $C_{12}$ to $C_{40}$ alkyl ester of (meth)acrylic acid.

The compositions of this invention also contain as polymerized units from 0 to 90 parts by weight, preferably 15 to 90 parts by weight, more preferably 20 to 80 parts by weight of at least one less than $C_{15}$ ethylenically unsaturated nonionic monomer. Suitable less than $C_{15}$ ethylenically unsaturated nonionic monomers for use in the preparation of the polymer compositions of this invention include, but are not limited to (meth)acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile.

Butyl acrylate, methyl methacrylate, and styrene are preferred. More preferred are butyl acrylate and methyl methacrylate.

The compositions of this invention also contain as polymerized units from 0 to 90 parts by weight, preferably 0.1 to 50 parts by weight, more preferably 1 to 10 parts by weight ethylenically unsaturated acid containing monomer or salts thereof. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

The compositions of this invention also contain as polymerized units from 0.1 to 10 parts by weight, preferably 0.1 to 5 parts by weight, more preferably 0.1 to 3 parts by weight, based on the polymer weight of a cross-linker selected from a cross-linking agent and a cross-linking monomer. By cross-linker is meant a compound which has at least 2 reactive groups which will react with acid groups found on the monomers of the compositions of this invention. Cross-linking agents useful in this invention include a polyaziridine, polyisocyanate, polycarbodiimide, polyamine, and a polyvalent metal. The cross-linking agent is optional, and may be added after polymerization has been completed.

Cross-linking monomers are cross-linkers which are incorporated with the monomers of the compositions of this invention during polymerization. Cross-linking monomers useful in this invention include divinyl benzene, (meth) acryloyl polyesters of polyhydroxylated compounds, divinyl esters of polycarboxylic acids, diallyl esters of polycarboxylic acids, diallyl dimethyl ammonium chloride, triallyl terephthalate, methylene bis acrylamide, diallyl maleate, diallyl fumarate, hexamethylene bis maleamide, triallyl phosphate, trivinyl trimellitate, divinyl adipate, glyceryl trimethacrylate, diallyl succinate, divinyl ether, the divinyl ethers of ethylene glycol or diethylene glycol diacrylate, polyethylene glycol diacrylates or methacrylates, 1,6-hexanediol diacrylate, pentaerythritol triacrylate or tetraacrylate, neopentyl glycol diacrylate, cyclopentadiene diacrylate, the butylene glycol diacrylates or dimethacrylates, trimethylolpropane di- or tri-acrylates, (meth)acrylamide, n-methylol (meth)acrylamide, mixtures thereof, and the like. (Meth)acrylamide, n-methylol (meth) acrylamide, and mixtures thereof are preferred. The amount of cross-linker utilized is chosen such that the cross-linker does not interfere with film formation.

Chain transfer agents may be used to control the molecular weight of the polymer composition. Suitable chain transfer agents include mercaptans, such as, for example, dodecylmercaptan. The chain transfer agent may be used at from 0.1% to 10% based on the total weight of the polymeric composition.

The polymer compositions of this invention are useful in fiber, nonwoven, textile, and paper compositions.

The polymer compositions of this invention are typically used in fiber, nonwoven, textile, and paper compositions. A substrate such as fiber, nonwoven, textile, or paper is coated or treated with the polymer composition by dipping the substrate in the polymer composition or by spraying the polymer composition onto the substrate. The coated substrate is then dried at a temperature from ambient to 200° C. The substrate may then be cured at temperatures from ambient to 200° C. It is preferred that enough polymer composition is utilized to give a binder add-on of from 2% to 200% on finished product weight. It is more preferred that enough polymer composition is utilized to give a binder add-on of from 10% to 50% on finished product weight.

The following abbreviations are used throughout this patent application: LMA=lauryl methacrylate SMA=stearyl methacrylate St=styrene MMA=methyl methacrylate BA=butyl acrylate MAA=methacrylic acid nDDM=n-dodecyl mercaptan Id.=sample identification number CD=methyl-β-cyclodextrin g=grams ° C.=degrees centigrade (meth)acrylate=methacrylate and acrylate cc=cubic centimeter MMAM=50% methacrylamide/50% n-methylol methacrylamide cm=centimeter MAM=90% n-methylol acrylamide/10% acrylamide mm=millimeter oz/sq yd=ounce/square yard ml=milliliter psi=pounds per square inch Abs.=absorbance RH=relative humidity wt=weight rpm=rotations per minute The following Table lists some of the materials used in this patent application and their sources:

| Material | Function | Source |
|---|---|---|
| Triton ® XN-45S | surfactant | Union Carbide |
| FC ®-280 | fluorochemical | 3M Company |
| Michem Lube ® 743 | wax | McGee |
| Mikon ® NRW-3 | surfactant | Sequa Chemical Company |
| Aircel ® PC-6A | methylated melamine | Borden (Astro Industries) |
| Cymel ® 303 | melamine | Cytek |
| Scotch ® Magic Tape | Tape | 3M Company |
| Triton ® X-100 | surfactant | Union Carbide |

EXAMPLE 1

For stage 1, 400 g deionized water, 11.9 g Triton® XN-45S anionic surfactant (58%), and CD (Table 1, 53% solution in water) were introduced into a 4-liter round bottom flask with four necks equipped with a mechanical stirrer, temperature control device, condenser, monomer and initiator feed lines, and a nitrogen inlet at room temperature. The contents were heated to 85° C. while stirred under a nitrogen purge. A monomer emulsion of 31.3 g deionized water, 0.4 g Triton® XN-45S anionic surfactant, 33.8 g LMA, 7.5 g BA, 33 g MMA, and 0.75 g MAA was prepared separately. Solutions of 0.35% by weight sodium carbonate (based on the total monomer weight in stage 1 and stage 2) in 25 g deionized water and 0.35% by weight sodium persulfate (based on the total monomer weight in stage 1 and stage 2) in 30 g deionized water were introduced into the reaction kettle. The monomer emulsion was fed over a period of 20 minutes together with an initiator solution of 0.05% sodium persulfate (based on the total monomer weight in stage 1 and stage 2) in 210 g deionized water.

For stage 2, a monomer emulsion was prepared using 625 g deionized water, 7.8 g Triton® XN-45S anionic surfactant, and monomers according to Table 1. Immediately after the end of the stage 1 monomer emulsion feed, the stage 2 monomer emulsion was fed over a period of 3 hours together with the sodium persulfate initiator solution.

TABLE 1

| Id. | LMA | SMA | BA | MMA | MAA | MAM | MMAM | CD |
|---|---|---|---|---|---|---|---|---|
| 1 | 300 | 0 | 525 | 660 | 15 | 0 | 0 | 14.3 |
| 2 | 675 | 0 | 225 | 585 | 15 | 0 | 0 | 14.3 |
| 3 | 780 | 0 | 0 | 705 | 15 | 0 | 0 | 14.3 |
| 4 | 0 | 975 | 0 | 480 | 15 | 0 | 30 | 28.6 |
| 5 | 0 | 975 | 0 | 510 | 15 | 0 | 0 | 28.6 |
| 6 | 0 | 750 | 285 | 450 | 15 | 0 | 0 | 28.6 |
| 7 | 750 | 0 | 435 | 270 | 15 | 30 | 0 | 14.3 |
| 8 | 0 | 975 | 0 | 480 | 15 | 30 | 0 | 28.6 |
| 9 | 750 | 0 | 735 | 0 | 15 | 0 | 0 | 14.3 |
| 10 | 0 | 975 | 0 | 510 | 15 | 0 | 0 | 28.6 |

Samples 4, 7, and 8 are examples of the compositions of this invention. All samples demonstrate the usefulness of the compositions in fiber, nonwoven, textile, and paper applications.

EXAMPLE 2

Application Testing—Impact Penetration Test

The impact penetration test measures the resistance of fabrics to the penetration of water by impact. (AATCC Test Method 42-1989) Samples that perform well in this test as indicated by water penetration of less than 1 g are considered to be good candidates as coatings/treatments for nonwoven and paper compositions.

To prepare samples for the test, a pulp substrate (Whatman Filter Paper No:4) was padded with a composition of this invention. The bath solids were 35% and the pad pressure was approximately ¾ bar. Samples were dried/cured for 3 minutes at 149° C. to give a binder add-on of 26% on finished product weight. The sample was tested in triplicate and the results were averaged.

The Impact Penetration test was run by pouring 500 mils of water through a spray nozzle and letting it impact a test fabric at a 45° angle and then measuring the amount of the water that penetrated the web and collected on a piece of blotter paper underneath the test sample. The results are shown in Table 2.

TABLE 2

| Sample | Amount of water penetration (g) |
|---|---|
| 6 | 0.3 |

The above data shows that a pulp substrate bonded with an SMA-containing composition is useful as a coating in nonwoven and paper compositions.

EXAMPLE 3

Application Testing—Water Absorption

The water absorption test was run to evaluate the hydrophobic properties of the compositions of this invention by measuring the percent water absorption of dried/cured films. Samples which perform well in this test as indicated by a percent water absorption of less than 35% are considered to be useful as coatings/treatments in nonwoven, textile, and paper compositions.

A film was prepared by drying latex in a container overnight. The film was then fully dried/cured for 3 minutes at 149° C. Film thickness ranged from 10–15 mils. The percent water absorption of various polymers was determined on dried/cured film samples with dimensions of 2.54 cm×2.54 cm×10 mils after allowing the films to soak in water for 48 hours. Samples were run in duplicate and averaged. The percent water absorption was determined for the compositions of this invention by using the following equations:

$$\% \text{ Water Absorption} = \frac{Wf - Wi}{Wi} \times 100$$

Where

Wi=the initial weight of the film

Wf=the final weight of the film after soaking in water for 48 hours.

The results are shown in Table 3.

TABLE 3

| Sample | Percent Water Absorption |
|---|---|
| 6 | 14.6 |
| 3 | 12.4 |
| 5 | 7.9 |

The data above indicates that the compositions are useful as coatings/treatments in nonwoven, textile, and paper compositions.

EXAMPLE 4

Application Testing—Tensile Testing and Handle-O-Meter

This test was run to demonstrate the utility of the compositions of this invention as coatings/treatments for nonwovens. It is known that polymers with high strength as indicated by tensile strength, normally are not acceptably soft. The acceptability of the binder is determined by scores of greater than 1,000 g for dry tensile; greater than 600 g for wet tensile; and greater than 300 g for isopropanol (IPA). The acceptable score for Handle-O-Meter is 50 grams force or less.

Pad Saturation: A 1 oz/sq. yd. polyester web was saturated with binder and dried/cured at 149° C. for 3 minutes. All samples had approximately 40% binder add-on based on fiber weight. From these sample webs tensile and Handle-O-Meter testing was done. The saturation formulation was as follows (8% Bath solids):

211.6 g Binder 4.8 g Catalyst 1.5% solids on solids (25% $NH_4NO_3$)

783.6 g Water

Tensile Testing: A 2.54×12.7 cm web sample with long axis in the cross machine direction was evaluated using a Intelect 500 Thwing Albert Testing Instrument. The instrument was set to have a 10.2 cm gauge length and a crosshead speed of 30.5 cm/minute. Dry, wet and Isopropanol tensile testing was done on an average of at least 7 sample strips. Wet tensiles were obtained by soaking the web strips in 0.1% Triton® X-100 surfactant for 30 minutes. Isopropanol tensiles were obtained by soaking the web strips for 30 minutes in Isopropanol. Results were reported in grams/2.54 cm.

Handle-O-Meter: Handle-O-Meter measurements were obtained from a 10.2×10.2 cm web sample. Measurements were made using a Thwing Albert Digital Handle-O-Meter (Model 211-5) using a 0.64 cm gap. The instrument measured the resistance to bend the nonwoven through a slit of a certain width. Results were reported in grams force. An average reading of machine and crossmachine direction from at least four samples each was obtained. The results of Tensile and Handle-O-Meter testing are shown in Table 4.

TABLE 4

| Sample | Dry Tensile | Wet Tensile | IPA Tensile | Handle-O-Meter |
|---|---|---|---|---|
| 5 | 2092 | 1339 | 546 | 107 |
| 90% 7/10% 8 (blend) | 1155 | 870 | 358 | 42 |

The compositions have acceptable softness of hand and offer excellent dry and wet tensile strength, and therefore are useful as coatings/treatments in nonwoven compositions.

EXAMPLE 5

Application Testing—Mason Jar Test for Water Repellency

This test was run to evaluate the water repellent/barrier properties of the compositions of this invention. The Mason Jar Test measured the resistance of a nonwoven fabric to the penetration of an aqueous sodium chloride solution under a hydrostatic head. This test can be used to measure how well a medical nonwoven fabric repels fluids. Samples are considered to be acceptable when they demonstrate a score of 120 minutes or greater.

The test was run by placing a swatch of the test fabric in place of the flat metal lid, adding 510 mls of 0.9% saline solution to the jar, inverting the jar (which has a hole in the bottom to equalize the pressure) and measuring the time it takes for the water to penetrate the fabric.

The samples used for the Mason Jar test were prepared in the following manner: A 1 oz/sq.yd. polyester web was padded using a binder/fluorochemical/wax bath. The solids of the bath were 35% and the padder pressure was ¾bar. A composition of this invention was evaluated. The padded samples were dried/cured for 3 minutes at 149° C. Total binder add-on was approximately 40% (based on finished product weight). Each sample was tested by the Mason Jar Test in triplicate and the results were averaged. The pad formulation was as follows (35% bath solids):

111 g Binder
8.1 g FC®-280 (5.6% Solids on binder solids)
18.75 g Michem Lube® 743 (wax) (12.0% Solids on Binder solids)
1.25 g Mikon® NRW-3 (2.5% Wet on binder solids)
30 g Water The results are shown in Table 5.

TABLE 5

| Sample | Time |
|---|---|
| 6 | 120–300 minutes |

The sample demonstrated an acceptable score and, therefore is considered useful as a coating/treatment for medical nonwoven compositions.

EXAMPLE 6

Application Testing—Water Vapor Transmission

This test was run to determine the rate for water to permeate through a film. Samples that perform well in this test, as indicated by a WVTR of 1 g/hour×meter squared are considered to be useful in nonwoven applications.

The test method used was Water Cup Method of ASTM E96-80. In this method, 30 mils of distilled water was added to a plastic cup. A polymer film (15–20 mils thick) which was dried/cured at 149° C. for 3 minutes was then placed over and sealed to the mouth of the cup using a threaded plastic ring. The cup was then placed in a constant temperature and humidity room (24° C./50% relative humidity) and periodic weighings of the cup were made to determine the rate of water movement through the polymer film to the controlled atmosphere. The weight loss was plotted against time until a nominal steady state existed. The slope of the straight line was the water vapor transmission rate. The water vapor transmission rate (WVTR) was determined using the following equation:

$$WVTR = \frac{G}{(T \times A)}$$

Where:
G=weight change
T=time
A=test area (mouth cup area)

WVTR was expressed in units of grams/hour×meter sq.
The results are shown in Table 6.

TABLE 6

| Sample | WVTR |
|---|---|
| 5 | 0.19 g/hour × meter sq |

The composition provides a good moisture barrier and therefore is considered to be useful as a coating/treatment in nonwoven compositions.

EXAMPLE 7

Application Testing—Flock Evaluation

This test was run to determine the potential for the compositions of this invention to be used as binders for flocked fiber applications.

Flock formulations were a blend of 70% 9/30% 10 which were mixed with 5% Clay and 1% Ammonium Stearate. The samples were formulated to approximately 43% solids and a Brookfield LVT viscosity of 19,000 milli pascal seconds (#4 spindle at 6 rpm). Osnaburg Polyester Cotton Fabric was the substrate for testing. The target add-on was 2.5–3.0 oz/sq yd. The sample was flocked with 3 denier flock using alternating current. The Flocked fabrics were dried and cured for 3 minutes at 150° C. Samples were evaluated with and without 2% Aircel PC-6A (melamine formaldehyde cross-linker). The Flocked fabrics were evaluated for: wash durability—cuff edge abrasion after five hot wash cycles, acceptable scores are between 4 and 5; and the British two pense scuff test evaluating abrasion, acceptable retention of scuff wet versus dry is greater than 30%. The scuff test was modified for flocked fabrics, counting the number of scuffs it took until adhesive failure was noted. The tests were run dry and wet. The results are shown in Tables 7, and 8.

TABLE 7

Flocked Fabric Evaluation (Wash Test)

| Sample | Result | Rating |
|---|---|---|
| 70% 9/30% 10 | Complete flock removal | 1 |
| 70% 9/30% 10 with Cymel 303 | >90% flock retention | 4 |

TABLE 8

Retained Wet Abrasion (British Two Pense Test)

| Sample | Result |
|---|---|
| 70% 9/30% 10 | 59% |
| 70% 9/30% 10/Aircel ® PC-6A | 91% |

The above results indicate that the compositions are useful as binders for fiber applications.

EXAMPLE 8

Applications Testing—Decorative Laminates

These tests were performed to demonstrate the utility of the compositions of this invention as binders in decorative laminate applications.

Saturant Composition

Latex/urea formaldehyde resin mixtures were prepared at 38% total latex and urea formaldehyde resin solids. Fifty parts of latex solids were combined with 50 parts of urea formaldehyde resin solids.

Saturation of sheets

A paper sheet was saturated using the above mixture by first floating the pre-weighed sheet on the mixture surface for 20 seconds, followed by immersion for 10 seconds. The penetration time was recorded as the elapsed time (in seconds) required for the saturant to completely strike through from the bottom side to the top surface of the sheet. Immediately after completing the saturation, the sheet was passed through a padder using a single pass at 12 psi to remove excess saturant. The wet sheet was weighed and the % pick up was calculated. The saturated sheet was cured for 2 minutes at 150° C. Acceptable scores for % pick-up are 20% to 60%.

Water Absorptiveness (Cobb Test)

A modified procedure of TAPPI Test Method T 441 om-84 was used to conduct this test. The method measured the quantity of water absorbed by the paper in a specified time under standardized conditions. A 12.7 cm by 12.7 cm square sample was tested. The procedure was modified to use 25 ml water instead of the 100 ml specified in the method, reducing the head from 1.0 cm to 0.25 cm. The test period was shortened from 120 seconds to 60 seconds. One ply of paper was tested at a time. The absorptiveness was calculated as the weight of water absorbed in grams per square meter. Acceptable scores are less than 20 grams per square meter.

Flexibility

Flexibility of the paper was determined by pre-conditioning three 1.5 cm by 4 cm specimens at 50% relative humidity and 21° C. for 24 hours and rapidly bending the specimens over a mandrel. A single test strip afforded testing of at least 3 different mandrel sizes. The mandrel diameter, measured to mm, which did not cause cracking of the sample surface was recorded as the pass point. The average of the 3 passing values was reported as the flexibility at 50% relative humidity. Smaller mandrel diameter correlated with increasing flexibility. Flexibility at low relative humidity was measured by drying 3–1.5 cm by 4 cm specimens for 5 minutes at 85° C. in a forced air oven, followed by rapidly bending the sample strip over the mandrel. The average mandrel diameter which did not cause cracking of the paper under these conditions was reported as the flexibility at low humidity. Acceptable scores for 50% RH and low % RH are less than 30 millimeters.

Scotch Tape Delamination Resistance

This test measured the cohesive strength of a single ply of paper to delamination of the ply when a 2.54 cm by 2.54 cm surface of the paper was contacted with Scotch Magic Tape™ for 5 seconds and for 24 hours at conditions of 50% relative humidity and 21° C. At each time interval, the tape was rapidly pulled by hand from the paper in the opposite direction from which the tape was applied. The percentage of the tape surface within the 2.54 cm contact area which showed no evidence of fiber removal was recorded as the delamination resistance of the sample immediately (5 seconds) after application of the tape or after 24 hours of contact. Acceptable scores are greater than 50%. The results of these tests are shown in Tables 9 and 10.

TABLE 9

| Sample | Penetration Speed | Wt % Dry Pick-Up |
|---|---|---|
| 1 | 1 | 46 |
| 2 | 1 | 46.2 |

TABLE 10

| Sample | Cobb Water Abs. | Tape Delamination Resistance | | Mandrel Flexibility (mm) | |
|---|---|---|---|---|---|
| | | Initial | 24 Hours | 50% RH | Low % RH |
| 1 | 8.5 | 100 | 73 | 1.75 | 2.8 |
| 2 | 6.5 | 97 | 78 | 1.5 | 3.1 |

The data above indicate that the compositions are useful in decorative laminant applications.

What is claimed:

1. A method of improving water repellency and durability in fiber, nonwoven, textile, and paper compositions comprising:
   a) providing a polymer composition comprising as polymerized units:
      i) from 9.5 to 100 parts by weight of at least one $C_{12}$ to $C_{40}$ alkyl ester of (meth)acrylic acid;
         from 0 to 90 parts by weight of at least one less than $C_{15}$ ethylenically unsaturated monomer;
         from 0 to 90 parts by weight of at least one ethylenically unsaturated acid containing monomer or salts thereof; and
         from 0 to 10 parts by weight of at least one cross-linking monomer; and
      ii) from 0 to 10 parts by weight, based on the polymer weight of at least one cross-linking agent; wherein the polymer composition is an emulsion polymer prepared by emulsion polymerization in the presence of a macromolecular organic compound with a hydrophobic cavity;

b) providing a substrate selected from the group consisting of fiber, nonwoven, textile, and paper;

c) coating the substrate with the polymer composition; and d) drying the coated substrate.

2. The method of claim 1 wherein the polymer composition comprises:

a) from 40 to 99 parts by weight of at least one $C_{12}$ to $C_{40}$ alkyl ester of (meth)acrylic acid, b) from 0 to 50 parts by weight of at least one monomer selected from the group consisting of methyl methacrylate and butyl acrylate;

c) from 0 to 50 parts by weight methacrylic acid; and d) from 0.1 to 5 parts by weight of at least one cross-linking monomer selected from the group consisting of (meth)acrylamide, n-methylol (meth)acrylamide, and mixtures thereof.

3. An article comprising:

a substrate selected from the group consisting of fiber, nonwoven, textile, and paper coated with a polymer composition comprising as polymerized units:

i) from 9.5 to 100 parts by weight of at least one $C_{12}$ to $C_{40}$ alkyl ester of (meth)acrylic acid;

from 0 to 90 parts by weight of at least one less than $C_{15}$ ethylenically unsaturated monomer;

from 0 to 90 parts by weight of at least one ethylenically unsaturated acid containing monomer or salts thereof; and from 0 to 10 parts by weight of at least one cross-linking monomer; and ii) from 0 to 10 parts by weight, based on the polymer weight of at least one cross-linking agent; wherein the polymer composition is an emulsion polymer prepared by emulsion polymerization in the presence of a macromolecular organic compound with a hydrophobic cavity.

4. An article according to claim 3 wherein the polymer composition comprises:

a) from 40 to 99 parts by weight of at least one $C_{12}$ to $C_{40}$ alkyl ester of (meth)acrylic acid, b) from 0 to 50 parts by weight of at least one monomer selected from the group consisting of methyl methacrylate and butyl acrylate;

c) from 0 to 50 parts by weight methacrylic acid; and d) from 0.1 to 5 parts by weight of at least one cross-linking monomer selected from the group consisting of methacrylamide, n-methylol methacrylamide, and mixtures thereof.

* * * * *